(12) United States Patent
Yang

(10) Patent No.: US 11,506,313 B2
(45) Date of Patent: Nov. 22, 2022

(54) MULTI-PETALED OBLIQUE-PLANE HOOP AND PIPE CONNECTOR THEREOF

(71) Applicant: Shunli Yang, Nanjing (CN)

(72) Inventor: Shunli Yang, Nanjing (CN)

(73) Assignee: Shunli Yang, Yancheng (CN)

( * ) Notice: Subject to any disclaimer, the term of this patent is extended or adjusted under 35 U.S.C. 154(b) by 746 days.

(21) Appl. No.: 16/322,490

(22) PCT Filed: Jul. 31, 2017

(86) PCT No.: PCT/CN2017/095213
§ 371 (c)(1),
(2) Date: Feb. 1, 2019

(87) PCT Pub. No.: WO2018/024174
PCT Pub. Date: Feb. 8, 2018

(65) Prior Publication Data
US 2021/0332920 A1    Oct. 28, 2021

(30) Foreign Application Priority Data

Aug. 1, 2016 (CN) .......................... 201610626698.7

(51) Int. Cl.
| | |
|---|---|
| *F16L 23/08* | (2006.01) |
| *F16L 23/10* | (2006.01) |
| *F16L 23/04* | (2006.01) |
| *F16L 23/032* | (2006.01) |
| *F16L 23/036* | (2006.01) |

(52) U.S. Cl.
CPC .............. *F16L 23/08* (2013.01); *F16L 23/04* (2013.01); *F16L 23/10* (2013.01); *F16L 23/032* (2013.01); *F16L 23/036* (2013.01)

(58) Field of Classification Search
CPC .......... F16L 23/04; F16L 23/08; F16L 23/032
USPC ................................................ 285/367, 415
See application file for complete search history.

(56) References Cited

U.S. PATENT DOCUMENTS

| | | | | |
|---|---|---|---|---|
| 1,978,453 | A | * | 10/1934 | Flynn ............................ 285/367 |
| 3,421,652 | A | * | 1/1969 | Warman .................. F16L 23/08 |
| | | | | 285/367 |
| 4,065,846 | A | * | 1/1978 | Leonard, Jr. .................. 285/367 |

(Continued)

FOREIGN PATENT DOCUMENTS

| | | |
|---|---|---|
| CN | 102011909 | 4/2011 |
| CN | 203756982 | 8/2014 |

(Continued)

OTHER PUBLICATIONS

GB150.3 Pressure Vessels—Part 3: Design, State Administration of Quality Supervision, Inspection and Quarantine of China, GB 150.3—2011.

*Primary Examiner* — Zachary T Dragicevich
(74) *Attorney, Agent, or Firm* — Treasure IP Group, LLC

(57) ABSTRACT

A multi-petaled oblique-plane hoop and a pipe connector are described. The hoop is divided into two groups, and the hoop petals in each group are connected by means of pins, and the pins are parallel to a connecting pipe shaft. The groups are connected by using bolts, and the bolts are vertical to a pipe shaft. Each hoop petal is in a shape of a partial ring stud, in which an arc-shaped groove is formed. The upper surface and the lower surface of the groove are symmetrical partial inner cone surfaces, and the hoop petals are connected to form a clamping chain.

12 Claims, 6 Drawing Sheets

A

B

C

(56) References Cited

U.S. PATENT DOCUMENTS

| | | | | |
|---|---|---|---|---|
| 4,722,561 | A | * | 2/1988 | Heckethorn ............ F16L 23/08 |
| 5,908,210 | A | * | 6/1999 | Fetzer ........................... 285/367 |
| 7,515,673 | B2 | * | 4/2009 | Jensen |
| 2016/0010771 | A1 | * | 1/2016 | Cheng-Sheng ......... F16L 23/08 |

FOREIGN PATENT DOCUMENTS

| | | |
|---|---|---|
| CN | 203948828 | 11/2014 |
| CN | 204717181 | 10/2015 |
| CN | 105423024 | 6/2016 |
| CN | 20160108699 | 9/2016 |
| CN | 106439313 | 2/2017 |
| EP | 2019245 | 1/2009 |

* cited by examiner

MULTI-PETALED OBLIQUE-PLANE HOOP AND PIPE CONNECTOR THEREOF

CROSS REFERENCE TO RELATED APPLICATION

This application claims priority to a PCT application PCT/CN2017/095213, filed on Jul. 31, 2017, which in turn takes priority of Chinese Application No. 201610626698.7, filed on Aug. 1, 2016. Both the PCT application and Chinese Application are incorporated herein by reference in their entireties.

TECHNICAL FIELD

The invention relates to machinery, more particularly to a hoop and a pipe connector for the hoop, which are suitable for pipe connection in petrochemical engineering, chemical engineering, pharmaceutical, electric power, metallurgical and boiler industries.

BACKGROUND TECHNOLOGY

In the industry, pipes are usually connected through flanges or flanged valves. Flanges are bulky, material wasting and difficult to install, but have no good substitutes all the time. For pipes of small calibers below DN50, unions can be used in place of flanges. Compared to the flanges, the unions are easier to install, have a weight 20~30% of the flange weight, and require 30~50% lower cost. The union type valves require materials and costs which are lower than the flanged valves by similar extent. Although being only used for civil pipe connection at present, the union type valves will be popularized in the chemical engineering industry sooner or later. The annular-ring seal gasket proposed by the inventor has solved the sealing problem of unions used for chemical engineering. Please see CN 203756982 U and CN 204717181 U. For large-caliber pipes, hoops can be used in place of flanges, but hoops use rubber seals which are only suitable for water pipe connection. Therefore, hoops are only applied in fire-fighting water pipes, foods and pharmaceutics and rarely used in other industries. High-pressure hoops used in the petroleum industry adopt hard seal ring gaskets which have high processing precision requirement and high fabrication costs, thus being unable to popularize.

The existing hoop is mainly used for water pipe connection and composed of a hoop, a long neck flange, a bolt and a seal gasket, as shown in FIG. 1. The existing hoop usually has 2 petals or 3 petals to the maximum (see the national standard). After being installed, the inner cone surface of the hoop petal and the outer cone surface of the long neck flange fit with each other completely. In FIG. 1, "b" is the point of tangency. Suppose that the seal gasket is an asbestos gasket. If leakage is found after a period of use, the seal gasket needs to be tightened. After tightening, the hoop petal shrinks inwardly, and the point of tangency moves from point b to point c. At this time, the diameter of the inner cone circle of the hoop petal on the axial section D-D is larger than the diameter of the outer cone circle of the long neck flange. The same applies on other sections. The two cone surfaces do not closely fit with each other anymore, the inner cone surface of one hoop petal fits with the outer cone surface of the long neck flange only through a line which is in the middle of the inner cone surface of the hoop petal, the two sides of the hoop petal upwarp, and two hoop petals only have two fitting lines. If the gasket seals or the nut cannot be tightened any more when the hoop does not reach the point b, one hoop petal and the cone surface of the long neck flange have two fitting lines which are outside the hoop petal, the hoop petal is convex in the middle, and because the lugs of two adjacent hoop petals are very close to each other, the two fitting lines act like just one fitting line. It can be seen that the existing hoop seal gasket can only be a soft seal, rather than a forced seal gasket like an asbestos gasket and a spiral wound gasket.

In summary, after the existing hoop is installed, the inner cone surface of the hoop petal fits with the outer cone surface of the conical head of the connecting pipe, without any displacement allowed. When the hoop is installed in position, the hoop petals will upwarp if the bolt is excessively tightened. Therefore, only soft seals like rubber O rings and rubber C rings with self-tightening function can be used, largely restricting the hoop application range.

Hoops are also used for high-pressure pipe connection in the petroleum industry. The seal gaskets used are octagonal rings. The hoops are manufactured by installing the hoops and gaskets to form rings and finish-turning the rings. The hoops are expensive and can only be used for small-caliber pipes. Actually, it is pointed out in GB150.3 "Pressure Vessels—Part 3: Design" that hoop "seal rings shall have self-tightening function" (p 281) and thus the seal rings can only be rubber O rings or rubber C rings.

Therefore, the hoops are not popularized in the industry, but only popularized by force in fire prevention and water supply and discharge pipes. The seal rings are rubber C rings. Most of the fluids conveyed in the pipes in the chemical engineering industry is flammable and explosive media at high temperature. The gaskets are not allowed to be rubber, and thus the existing hoops cannot be applied in the chemical engineering industry.

DE 950 522 C (BAYER AG) filed 22 Nov. 1956 discloses a flange which may provides a quick closure for pipes and vessels. The clamping device comprises a conical interposed seal flanges and a corresponding conical profile, multi-membered clamping ring. Specifically, each link of the clamping ring are moveably arranged in a joint, and can be coupled together by means of tensioning lever device. The multi-membered ring are pulled together by the tension lock, and are equipped with an adjusting device which release the flange when pivoted apart. Further, the annular surface of the flange and the inner annular surface of the clamping ring are conically shaped so that the clamping ring can be easily solved when opening.

JP 2010 116977 A (CANON KK) filed 27 May 2010, discloses a pipe and a piping system, which includes a first flange at the end of a first pipe and a second flange provided at the end of a second pipe. In which, a plurality of dampers are connected to each other. Both ends thereof are fastened by screws in a state of being annularly formed along the first flange and the second flange. The piping has a flange part fixed by a member. The flange part has some recessed parts along the outer periphery thereof.

SUMMARY OF THE INVENTION

On the basis of the traditional hoop, the invention aims to propose a novel hoop and a pipe connector for the hoop: a multi-petaled oblique-plane hoop and a pipe connector for the multi-petaled oblique-plane hoop, which are called a plane hoop and a hoop connector for short. The joint surfaces between the hoop petals and the conical head of a connecting pipe are oblique planes, where seal gaskets like asbestos gaskets, spiral wound gaskets and metal rings can be used. The hoop and the pipe connector can be used for connecting low/medium/high pressure pipes or pipes with flammable and explosive media in place of flanges of over DN50.

The invention adopts the following technical scheme: a multi-petaled oblique-flat-surface hoop, in which the hoop is divided into two groups, and hoop petals in each group are connected by pins, and the pins are parallel to an axial direction of a connecting pipe; the hoop groups are connected by bolts, and the bolts are vertical to the axial direction of the connecting pipe; each hoop petal is in a shape of a partial ring stud, in which an arc-shaped groove is formed; an upper surface and a lower surface of the arc-shaped groove are symmetrical partial inner cone surfaces, and the hoop petals are connected to form a clamping chain, the partial inner cone surface of each hoop petal is convex in the middle to form a trapezoidal flat surface which is parallel to the partial inner cone surface, an oblique angle of the trapezoidal flat surface is equal to the taper angle of the partial inner cone surface, the taper angle is an angle between a normal direction of a cone surface and an axial direction of the cone surface. A sum of trapezoid angles γ formed by extending two sides of a trapezoidal surface of each hoop petal to a center of circle of the clamping chain is Γ=180~300°, and a trapezoid angle of a single hoop petal is γ=Γ/N wherein N is a hoop petal number. The present disclosure further propose a pipe connector, including a hoop as described above and a connecting pipe, characterized in that, one end of the connecting pipe is a pipe head, the other end thereof is a convex conical head, the pipe head is welded to a pipe, an outer taper angle of the convex conical head is equal to an inner taper angle of the hoop petal, and a plurality of concave trapezoidal oblique planes parallel to an outer cone surface of the convex conical head are formed on the outer cone surface; a set of clamping chain as recited in claim 1 and a pair of connecting pipes form a set of pipe connector, a seal gasket is provided between conical heads of two connecting pipes, and pipe heads of the two connecting pipes are respectively welded to the pipes on two sides or connected to the pipes on two sides through threads. The pipe connector is used for valve production, and a valve is connected with the pipe through the clamping chain; the connecting pipe has a caliber of DN50~700.

Beneficial effects: the hoop connector proposed by the invention can be used for connecting a pipe of DN15~3000, preferably DN50~700. The working pressure ranges from low pressure to high pressure. The working temperature ranges from subzero temperature to high temperature. The hoop is made of galvanized carbon steel, black carbon steel, phosphatized carbon steel, nickel-plated carbon steel or stainless steel. The connecting pipe is made of carbon steel, stainless steel or another material. The hoop and the connecting pipe are both manufactured by forging and machining blanks, and are mainly used in the chemical engineering industry. The hoop and the connecting pipe can also be cast if being used for civil pipe connection.

The hoop connector proposed by the invention has a weight 20~30% of that of a pair of flanges, except the straight section of the connecting pipe. The connecting pipe has a weight 2.5~6% of that of the pair of flanges, except the straight section. The hoop connector is easily manufactured with low size requirements except for the taper angle. After the hoop connector is marketized, the low-pressure carbon steel hoop connector costs a half of a flange, and the medium/high pressure hoop connector is more advantageous in the price. The stainless steel hoop connector costs 20~30% of the price of the stainless steel flange. The hoop connector can be used for valve manufacturing. The flanges on the two sides of a valve are replaced with the connecting pipe which is connected with a pipe through the pipe connector, greatly reducing the manufacturing cost and the price of the valve. Popularization of the hoop connector of the invention will lead a revolution in the industrial pipe valve industry and pipe connection field, and has great significance to the development of modern industry and national economy.

DETAILED DESCRIPTION OF EMBODIMENTS

1. Design

Before description, the product and components thereof are designed, as shown in FIGS. 2-7.

In the invention, a hoop is divided into at least four petals, and the cone surface fitting of the traditional hoop is replaced with oblique-plane fitting. The hoop is called the multi-petaled oblique-plane hoop, the plane hoop for short. The traditional hoop is called the cone hoop for short. The part of the pipe connector of the hoop welded with a pipe is called the long neck flange in the existing standards and literatures, and called the connecting pipe herein. The end of the connecting pipe connected with the pipe is called the butt-welded end, and the other end connected with the hoop is called the conical head.

Figure 1:
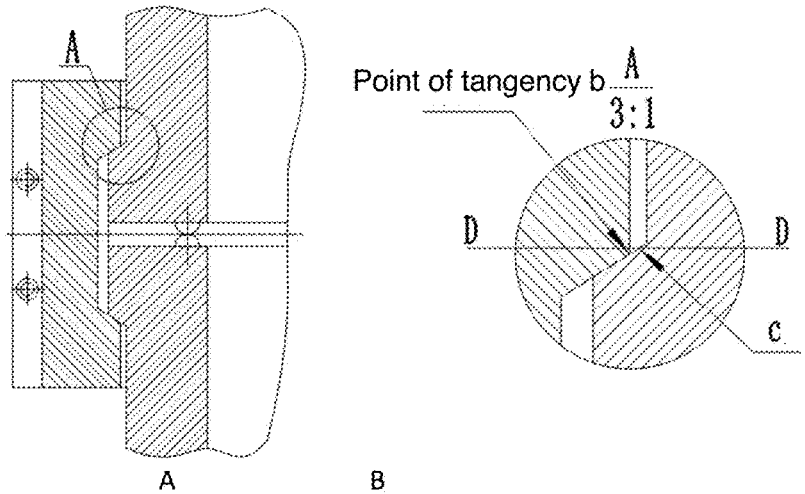
FIG. 1 shows a traditional hoop, in which A is the installation diagram of the traditional hoop, and B is the partially enlarged diagram of A.
Figure 2:
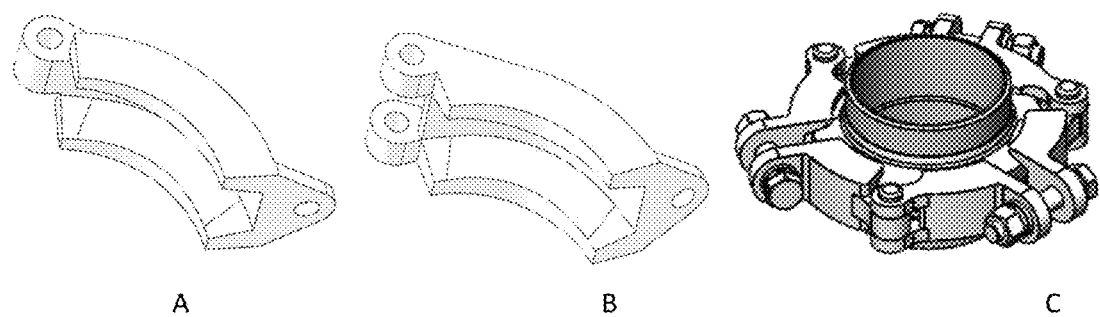
FIG. 2 is a perspective view of a hoop connector, in which A: a schematic diagram of a nose-end hoop; B: a schematic diagram of an ear-end hoop and C is the assembly diagram.
Figure 3:
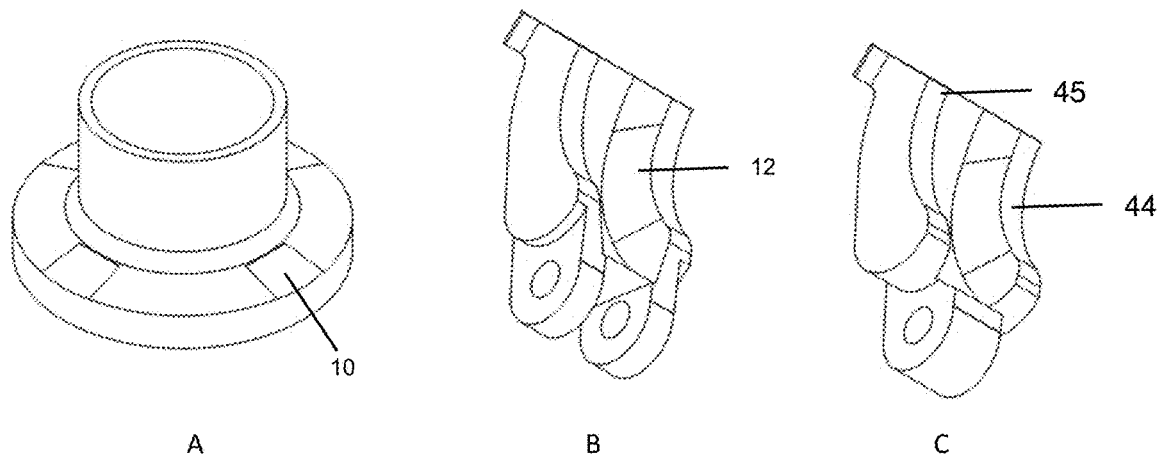
FIG. 3 is the three-dimensional projection drawing of the hoop connector assembly, in which A is the connecting pipe, B is the ear-end hoop and C is the nose-end hoop, 9—an outer cone surface. 10—concave trapezoidal oblique plane; 11—inner cone surface; 12—protruded trapezoidal surface; 44 lower surface of the arc-shaped groove; 42 upper surface of the arc-shaped groove.
Figure 4:
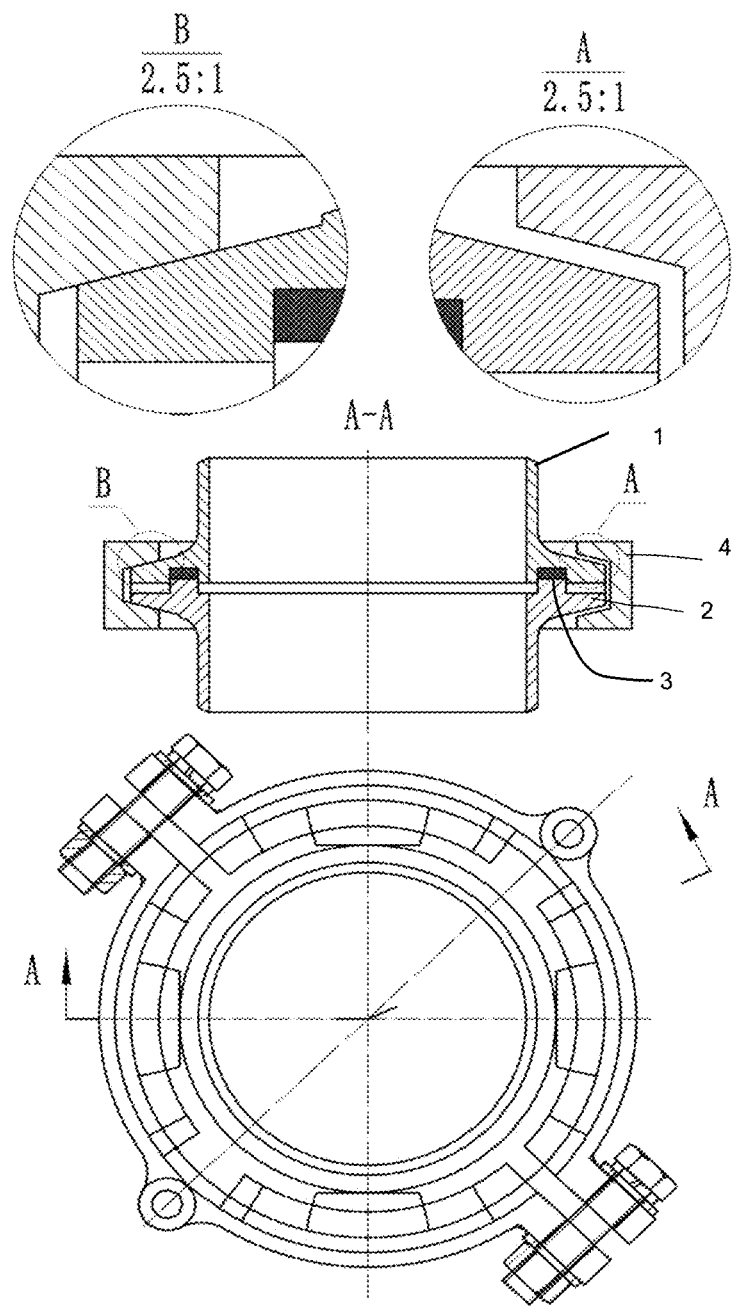
FIG. 4 is a sectional view of the hoop connector, in which 1: a schematic diagram of the connecting pipe; 2: a schematic diagram of the seal gasket; 3: a schematic diagram of the hoop; and 4: a schematic diagram of the lower connecting pipe.

The pipe connector of the hoop is composed of four parts, the hoop, the connecting pipe, the bolts and the pins, among which the hoop and the connecting pipe are the main parts and the bolts and the pins are connecting parts (accessories). The hoop is divided into two types, an edge hoop and a middle hoop. The edge hoop is divided into a nose-end hoop and an ear-end hoop, and the nose-end hoop, the ear-end hoop and the middle hoop are also called single hoops. The hoop petal number is the multiple of 2 (even number), which is at least 4. FIGS. 2 and 3 are the three-dimensional diagram and the three-dimensional projection diagram of the pipe connector of a four-petal hoop, in which shows is the nose-end hoop, B shows the ear-end hoop and C is the assembly diagram. The pipe connector assembly of the hoop is called the hoop connector for short. A lug is formed at one end of each of the edge hoops (A and B), a pin nose is formed at the other end of the nose-end hoop (A), and a pin ear is formed at the other end of the ear-end hoop (B). In a four-petal hoop, one nose-end hoop and one ear-end hoop are connected through the pin to form a group of hoops, two groups of hoops are connected through the bolt to form a whole body, which is called the clamping chain herein. The clamping chain and the connecting pipe form the hoop connector.

Figure 7:
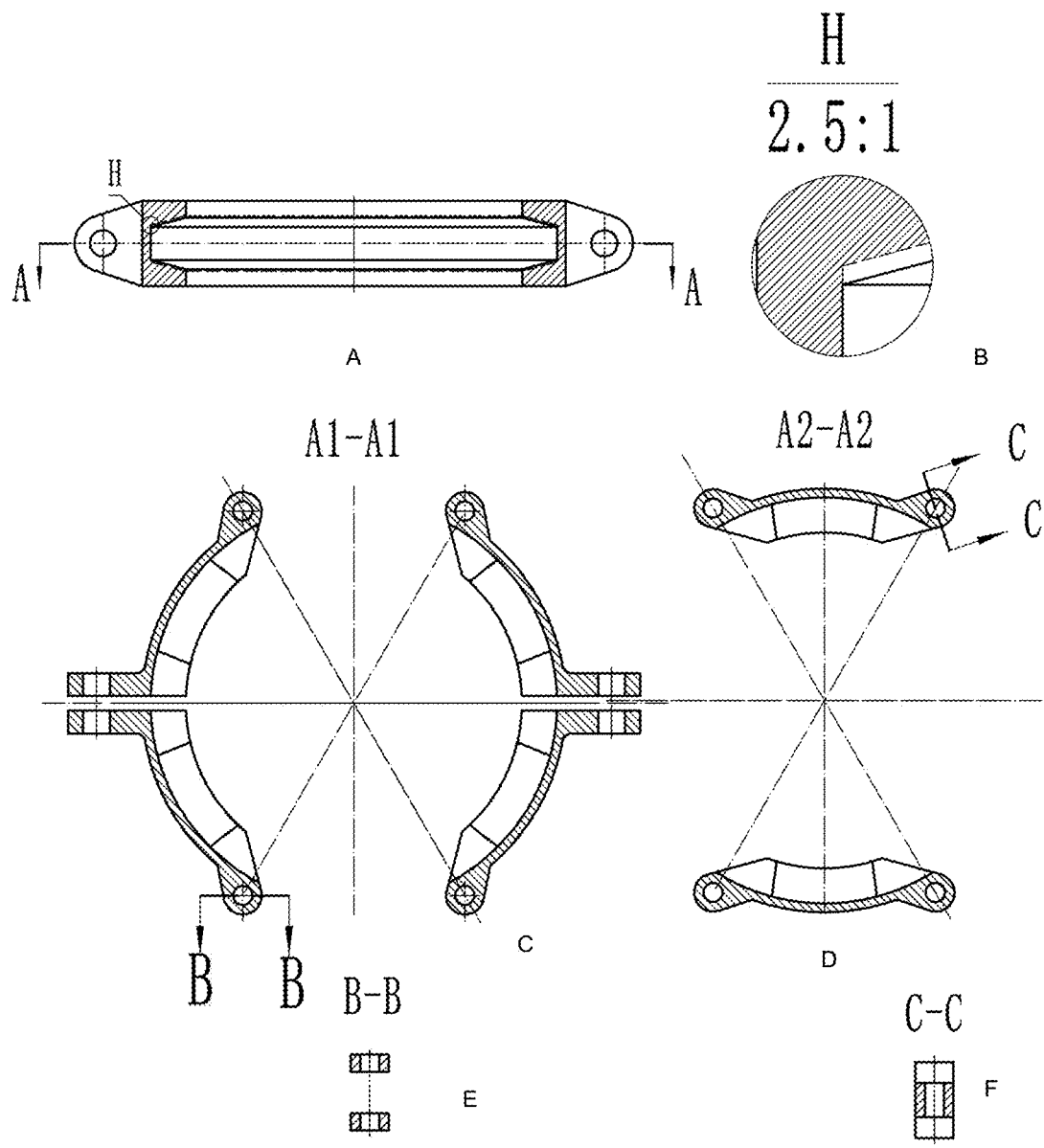
FIG. 7 is a schematic diagram of a six-petal hoop, in which A: a vertical sectional view of the six-petal hoop; and B: a partially enlarged top view of A; C and D: the sectional views of the left and right parts and upper and lower parts in A; and E: a sectional view taken along B-B in C; and F: a sectional view taken along C-C in D.
Figure 8:
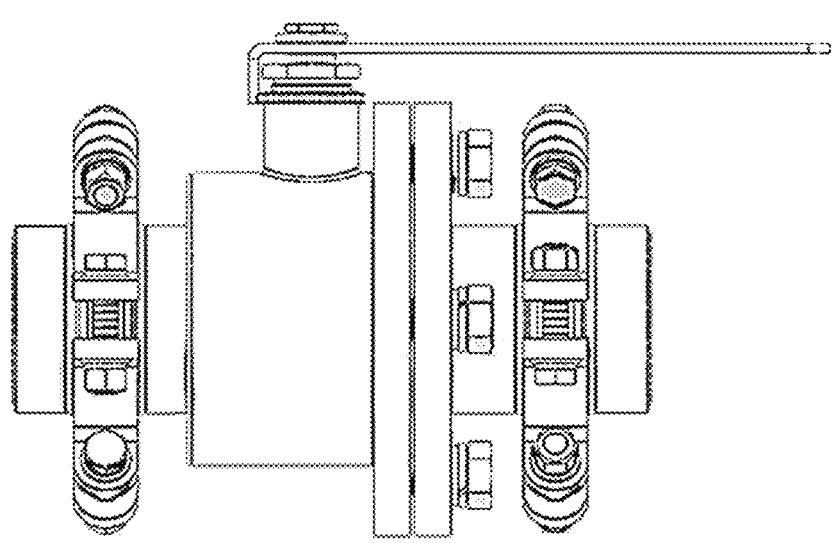
FIG. 8 is an illustration a valve used in conjunction of the connecting pipe and clamping chain assembly.

FIG. 7 is a six-petal hoop which is divided into two groups, each comprising three petals. The nose-end hoop and the ear-end hoop are on the two sides of each group and the middle hoop is in the middle of each group. The pin nose is at one end of the middle hoop, the pin ear is at the other end thereof, and the middle hoop is connected with the end hoop through the pin. The clamping chain formed by a hoop with at least six petals is composed of the three types of single hoops, the nose-end hoops, the ear-end hoops and the middle hoops. The hoop is manufactured only by using three types of dies.

A set of clamping chain and a pair of (two) connecting pipes form a set of pipe connector. The conical bottoms of the two connecting pipes are sealing surfaces, the sealing surfaces and the seal gaskets can be various types. The pipe heads of the two connecting pipes are respectively welded with the pipes on the two sides, or connected with the latter through thread.

The clamping chain is made of metal like carbon steel and stainless steel, and is manufactured by forging and machining blanks. The clamping chain is resistant to high temperature and high pressure, and can be used for flammable and explosive media.

The pipe connector of the hoop can be used for valve connection, i.e., the flange on the traditional flange-connected valve is replaced with the connecting pipe, and the valve is connected with the pipe through the clamping chain.

The pipe connector of the hoop adopts a forced seal gasket, is sized according to design standards of chemical engineering and petrochemical engineering, and is used for connecting pipes and equipment with flammable and explosive medium/high-pressure media.

The hoop can also be manufactured by forging. The pipe heads of the connecting pipes are welded with the pipes or connected with the latter through thread. The gasket is a forced seal gasket or a soft seal gasket. The hoop is used for connecting civil low-pressure pipes with non-inflammable media.

The pipe connector of the hoop (hoop connector) has a connecting pipe caliber of DN15~3000, preferably DN50~700.

2. Definition

The hoop connector is a new product which is mainly used for chemical engineering, petroleum, power generation, smelting and other industrial fields in place of the large-caliber flange of over DN50. The hoop connector is required to be designed according to the specifications of national standards on pressure vessels and on metallic industrial pipings. Before design formula derivation, all the parts are named and symbolled, as shown in the attached drawings.

b—effective width of the seal gasket;

$C_1$—negative deviation of pipe wall thickness of the butt-welded end of the connecting pipe, $C_1=12.5\%$;

$C_{Dn}$—bow length of the bow formed by the oblique plane of the conical head of the connecting pipe on the inscribed circle $D_n$, the circle diameter being $D_n+2v_D$ in calculation;

$C_{Dw}$—bow length of the bow formed by the oblique plane of the conical head of the connecting pipe on the circumscribed circle $D_w$;

$C_{En}$—bow length of the bow formed by the oblique plane of the hoop on the inscribed circle Dn, the circle diameter being $D_n+2v_E$ in calculation;

$C_{Ew}$—bow length of the bow formed by the oblique plane of the hoop on the circumscribed circle $D_w$;

$D_i$—inner diameter of the butt-welded end of the connecting pipe;

$D_o$—outer diameter of the butt-welded end of the connecting pipe;

$D_1$—diameter of the circle formed by intersection of the transition arc between the connecting pipe and the cone surface and the cone surface, $D_1=D_o+2r_1(1-\sin\alpha)$;

$D_n$—inscribed circle diameter, i.e., diameter at the point of tangency of the conical head of the connecting pipe, i.e., the caliber of the clamping chain;

$D_w$—circumscribed circle diameter, i.e., bottom diameter of the conical head of the connecting pipe;

$D_G$—effective diameter of the sealing surface;

$d_1$—minimum cross section diameter of the stud;

$d_2$—bolt hole diameter;

$d_3$—pin diameter;

$d_4$—pin hole diameter;

$d_5$—outer diameter of the pin ear;

E—inner diameter of the hoop;

$E_o$—outer diameter of the hoop;

$f_n$—straight section height of the hoop hole, i.e., hoop thickness at the inner point of tangency;

$f_w$—thickness at the point of tangency of the hoop, i.e., hoop thickness at the outer point of tangency;

$g_D$—distance between the cone surface and the oblique plane of the conical head of the connecting pipe;

$g_E$—distance between the cone surface and the oblique plane of the hoop;

Δg—distance between the oblique plane of the conical head of the connecting pipe and the oblique plane of the hoop after the hoop connector is assembled;

$h_n$—thickness at the point of tangency of the conical head of the connecting pipe, i.e., thickness of the conical head of the connecting pipe at the inner point of tangency;

$h_w$—stud section height of the conical head of the connecting pipe, i.e., thickness of the conical head of the connecting pipe at the outer point of tangency;

La—length of moment arm of the lug;

Lw—lug width;
Ln—lug thickness;
m—gasket factor without dimension;
N—hoop petal number;
$n_b$—safety factor of the tensile strength of the material;
$n_s$—safety factor of the yield strength of the material;
PN—nominal pressure, i.e., max. design working pressure (bar);
p—internal pressure (MPa), p=(PN+1)/10;
$r_1$—radius of the transition arc between the connecting pipe and the cone surface;
$r_2$—radius of the internal processed transition arc, i.e., the internal chamfer, being 1~2 mm;
$r_3$—radius of the external processed transition arc, i.e., the external chamfer, being 0.5~1 mm;
$u_1$—pin ear height;
$u_2$—pin nose height;
$v_D$—bow height of the bow formed by the oblique plane of the conical head of the connecting pipe on the circumscribed circle;
$v_E$—bow height of the bow formed by the oblique plane of the hoop on the inscribed circle;
y—specific sealing pressure of the gasket (MPa);
α—taper angle or oblique angle, i.e., included angle between the cone surface and the cone bottom and included angle between the normal direction of the cone surface and the axial direction of the cone surface, including the taper angle between the outer cone surface of the connecting pipe head and the inner cone surface of the hoop and the included angle between the oblique plane of the connecting pipe and the axial cross section, and the included angle between the oblique plane of the hoop and the axial cross section, with the four angles being equal to each other;
B—sum of N trapezoidal angles of the conical head of the connecting pipe;
$β_w$—trapezoidal angle of the connecting pipe, i.e., trapezoidal angle formed by extending the two sides of the trapezoidal oblique plane of the conical head of the connecting pipe to the center of circle of the connecting pipe, with the circumscribed circle $D_w$ as the reference and β=B/N;
$β_n$—trapezoidal angle of the connecting pipe, with the inscribed circle $D_n$ as the reference;
Γ—sum of the trapezoidal angles of the N single hoops of the clamping chain;
$γ_n$—trapezoidal angle of the hoop formed by extending the two sides of the trapezoidal oblique plane of the single hoop to the center of circle of the clamping chain, with the inscribed circle $D_n$ as the reference and γ=Γ/N;
$γ_w$—trapezoidal angle of the hoop, with the circumscribed circle $D_w$ as the reference;
$δ_D$—wall thickness of the butt-welded end of the connecting pipe;
$δ_E$—wall thickness of the cylinder section of the hoop;
ΔC—bow length margin, i.e., the length difference between the bow length of the oblique plane of the hoop and the bow length of the oblique plane of the conical head of the connecting pipe on the same circumference after installation, and the length difference on each side;
ΔL—hoop connector distance, i.e., distance between the hole edge of the clamping chain and the bottom line on the oblique plane of the conical head of the connecting pipe;
μ—friction angle, i.e., steel-steel, μ=5~8°, being μ1=5° to the min. and μ2=8° to the max.;
$σ_{b1}$—tensile strength of the connecting pipe material (MPa);
$σ_{b2}$—tensile strength of the hoop material (MPa);
$σ_{s3}$—yield strength of the bolt material and the pin material (MPa);
$[σ]_{b1}$—allowable stress of the connecting pipe material (MPa);
$[σ]_{b2}$—allowable stress of the hoop material (MPa);
$[σ]_{s3}$—allowable stress of the bolt material and the pin (shaft) material (MPa);
φ—wearing coefficient, which can be set equal to 0.8; a welding bevel is designed at the butt-welded end of the connecting pipe;
ω—bow length ratio of the bow length of the oblique plane of the hoop and the oblique plane of the conical head of the connecting pipe on the same circumference.

3. Fit Dimension (1) Trapezoidal Angle

The trapezoidal angle is the short form of the trapezoidal angle formed by extending the two sides of the trapezoidal oblique plane to the center of circle. Actually, the two sides of the oblique plane are not straight lines, but approximately straight lines. The area of the oblique plane of the connecting pipe is specified to be ¼ of the total area of the outer cone of the connecting pipe, namely, the sum of the trapezoidal angles of the connecting pipe B=90°. With the cylinder section diameter $D_w$ of the conical head of the connecting pipe as the reference, the included angle of a single oblique plane on the conical head of the connecting pipe is calculated by following formula:

$$β_w = \frac{90}{N}. \quad (3-1)$$

The design ensures that the contact surface of the hoop connector (the oblique plane of the hoop and the connecting pipe) is much bigger than the contact surface of the flange connector (between the flange and the bolt), avoiding flange warping and correction of the nominal gasket width $b_0$, namely, b=$b_0$.

The sum of the trapezoidal angles of the hoop is Γ. Through comparison among different design proposals, the sum Γ is preferably 180~300°. With the hoop hole diameter $D_n$ as a reference, the included angle of the oblique plane of each hoop is calculated by following formula:

$$γ_n = \frac{Γ}{N} \quad (3-2)$$

In consideration of tolerance, processing error and installation displacement, to ensure that the oblique plane of the hoop completely fits with the oblique plane of the connecting pipe, preferably, γ/β≥2.

(2) Distance Between Oblique Plane and Cone Surface

Figure 5:
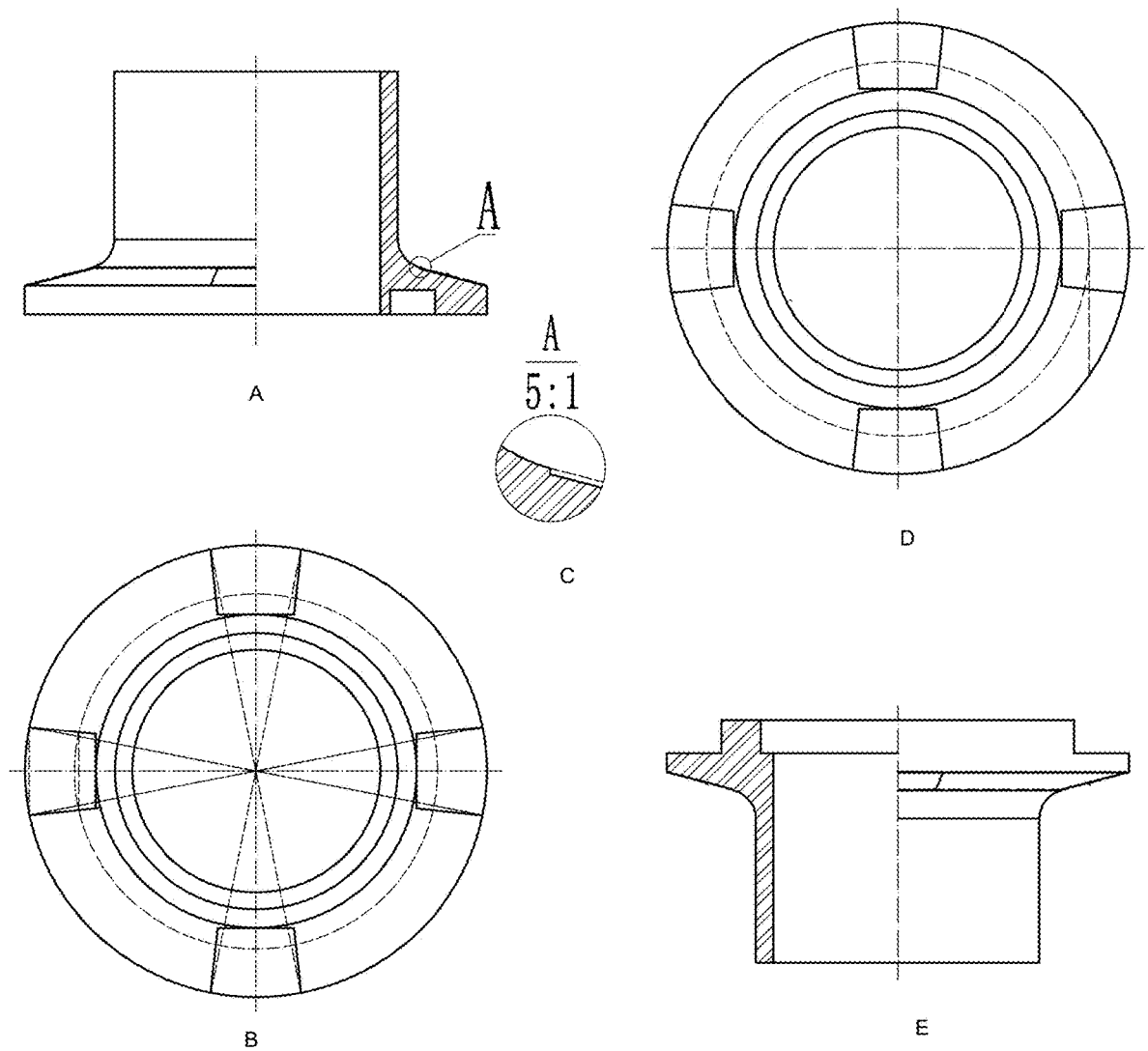
FIG. 5 is a schematic diagram of the connecting pipe, in which A and B: the vertical sectional view and the top view of the upper connecting pipe; C: a partially enlarged diagram of B; and D and E: the bottom view and the vertical sectional view of the lower connecting pipe.

As shown in FIG. 5, the bow height $v_D$ of the bow formed by the oblique plane of the conical head of the connecting pipe on the circumscribed circle $D_w$ is calculated by following formula:

$$V_D = \frac{D_w}{2}\left(1 - \cos\frac{β_w}{2}\right) \quad (3-3)$$

The distance $g_D$ between the oblique plane and the cone surface of the conical head of the connecting pipe is calculated by following formula:

$$g_D = \frac{D_w}{2}\left(1 - \cos\frac{\beta_w}{2}\right)\tan\alpha \qquad (3-4)$$

Figure 6:
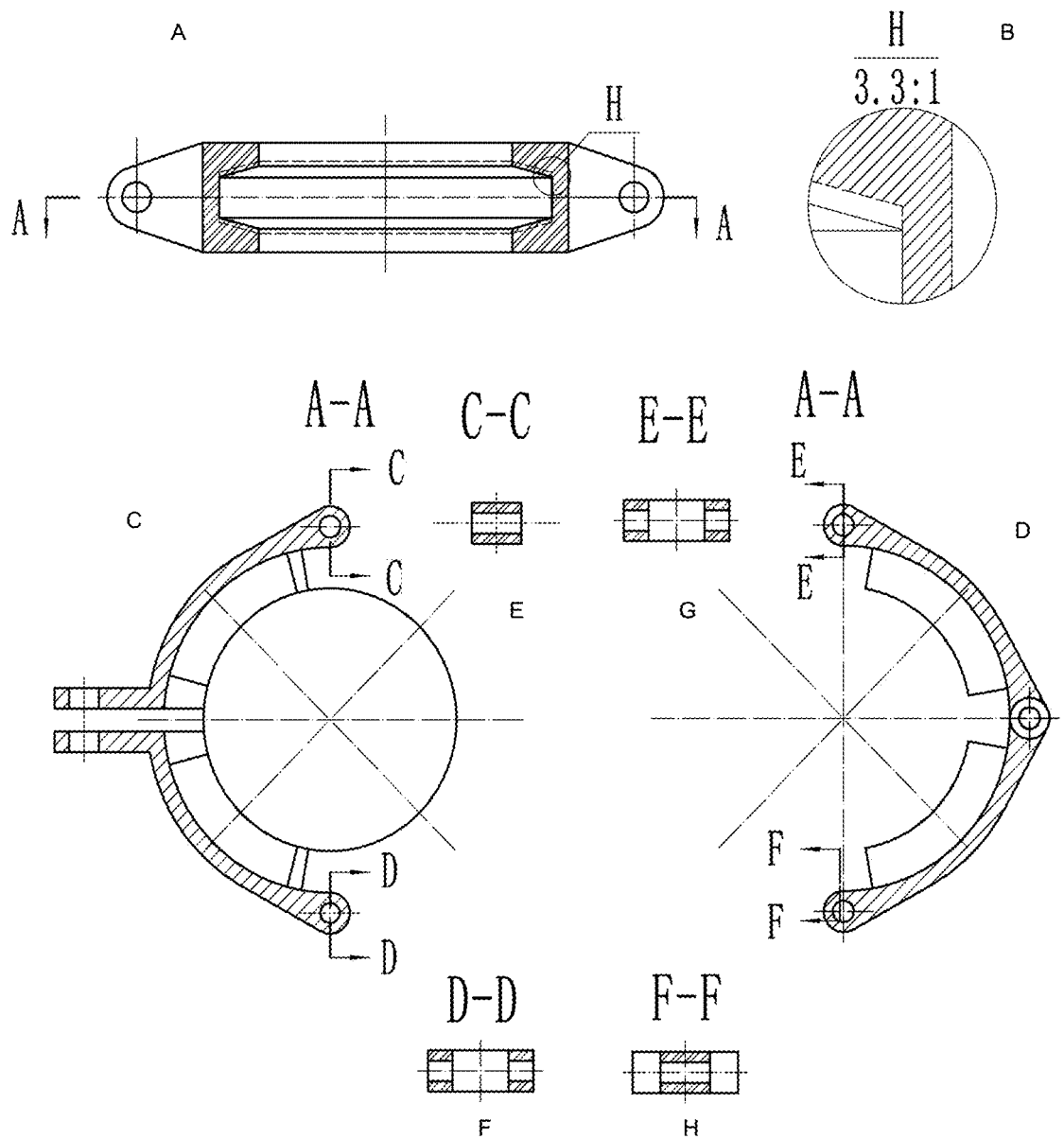
FIG. 6 is a schematic diagram of a four-petal hoop, in which A: a vertical sectional view of the four-petal hoop; and B: a partially enlarged top view of A; C and D: sectional views taken along A-A in A showing left and right parts of A; E: a sectional view taken along C-C in C; F: a sectional view taken along D-D in C; and G: a sectional view taken along E-E in D; and H: a sectional view taken along F-F in D.

As shown in FIG. 6, the bow height $v_E$ of the bow formed by the oblique plane of the hoop on the inscribed circle $D_n$ is calculated by following formula:

$$v_E = \frac{D_n}{2}\left(1 - \cos\frac{\gamma_n}{2}\right) \qquad (3-5)$$

The distance $g_E$ between the cone surface and the oblique plane of the hoop is calculated by following formula:

$$g_E = \frac{D_n}{2}\left(1 - \cos\frac{\gamma_n}{2}\right)\tan\alpha \qquad (3-6)$$

After the hoop connector is assembled, the distance $\Delta g$ between the oblique plane of the conical head of the connecting pipe and the oblique plane of the hoop is calculated by following formula:

$$\Delta g = g_E - g_D \qquad (3-7)$$

The design requires that $\Delta g$ is as large as possible and is not lower than 0.7 mm; namely, the two cone surfaces have a possibly largest distance.

Since the oblique plane is parallel to the cone surface, $g_D$ is equal at all the positions, $v_D$ is also equal at all the positions. The project curve of the sides of the trapezoidal oblique plane can be drawn, which is similar to a straight line.

(3) Bow Length Ratio

As shown in FIG. 5, the bow height $C_{Dw}$ of the bow formed by the oblique plane of the conical head of the connecting pipe on the circumscribed circle $D_w$ (cone bottom circle) is calculated by following formula:

$$C_{Dw} = D_w \sin\frac{\beta_w}{2} \qquad (3-8)$$

Since the oblique plane is parallel to the cone surface, $g_D$ is equal at all the positions, $v_D$ is also equal at all the positions. It can be derived that the trapezoidal angle $\beta n$ of the conical head of the connecting pipe on the inscribed circle $D_n$ (hole circle of the clamping chain) is calculated by following formula:

$$\beta_n = 2\cos^{-1}[1 - \frac{D_w}{D_n + 2v_D}\left(1 - \cos\frac{\beta_w}{2}\right)] \qquad (3-9)$$

The bow length $c_{Dn}$ of the bow formed by the oblique plane of the conical head of the connecting pipe on the inscribed circle is calculated by following formula:

$$C_{Dn} = (D_n + 2v_D)\sin\frac{\beta_n}{2} \qquad (3-10)$$

Similarly, the bow length $c_{En}$ of the bow formed by the oblique plane of the hoop on the inscribed circle is calculated by following formula:

$$C_{En} = (D_n + 2v_E)\sin\frac{\gamma_n}{2} \qquad (3-11)$$

The trapezoidal angle $\gamma_w$ of the hoop on the circumscribed circle is calculated by following formula:

$$\gamma_w = 2\cos^{-1}[1 - \frac{D_n + 2v_E}{D_w}\left(1 - \cos\frac{\gamma_n}{2}\right)] \qquad (3-12)$$

The bow length $c_{Ew}$ of the bow formed by the oblique plane of the hoop on the circumscribed circle is calculated by following formula:

$$C_{Ew} = D_w \sin\frac{\gamma_w}{2} \qquad (3-13)$$

The bow length ratios of the hoop to the conical head of the connecting pipe on the inscribed and circumscribed circles are respectively calculated by following formulas:

$$\omega_n = \frac{C_{En}}{C_{Dn}} \qquad (3-14)$$

$$\omega_w = \frac{C_{Ew}}{C_{Dw}} \qquad (3-15)$$

The bow length margins of the hoop and the conical head of the connecting pipe on the inscribed and circumscribed circles are respectively calculated by following formulas:

$$\Delta C_n = \frac{C_{En} - C_{Dn}}{2} \qquad (3-16)$$

$$\Delta C_w = \frac{C_{Ew} - C_{Dw}}{2} \qquad (3-17)$$

The bow length ratio $\omega$ and the bow length margin $\Delta C$ reflect the fit reliability of the oblique plane of the hoop and the oblique plane of the conical head of the connecting pipe. For the hoop connector of at least DN50, the design requires $\omega \geq 2$ and $\Delta C \geq 10$ mm. The bow length ratio $\omega$ of the hoop to the connecting pipe is very similar to the trapezoidal angle ratio, i.e., $\omega \approx \gamma/\beta \geq 2$.

(4) Hoop Connector Distance

The diameter of the circle at the point of tangency on the center line of the oblique plane of the conical head of the connecting pipe is $D_n$, and the diameter of the hoop hole is also $D_n$. The diameter of the circle formed by intersection of the transition arc $r_1$ between the outer diameter of the connecting pipe and the cone surface and the cone surface is $D_1$, and the top line of the trapezoid on the oblique plane of the conical head of the connecting pipe intersects with the circle $D_1$. The distance between the hole edge (circle $D_n$) of the clamping chain and the top line (circle $D_1$) of the trapezoid on the oblique plane of the conical head of the connecting pipe is called the hoop connector distance $\Delta L$. It can be derived from FIG. 5 that:

$$\Delta L = \frac{D_n - D_1}{2} - v_D \quad (3\text{-}18)$$

According to the design, $\Delta L=4\sim6$ mm; $\Delta L$ shall be larger for the large-caliber hoop connector.

4. Stress Analysis

The following design calculation formulas mainly refer to the standard explanations in the national standard GB 150-2011 of "Pressure Vessels", the national standard GB 150.14~2.11 of "Pressure Vessels", the national standard GB 50316-2000 of "Design Code for Industrial Metallic Piping" and the national standard in the chemical industry HG/T 20582-2.11 of "Specification of Strength Calculation for Steel Chemical Vessels".

4.1 Axial Load (1) The tension $F_i$ acted by the internal pressure on the axial cross section of the connecting pipe is calculated by following formulas:

$$F_i = 2 \times \frac{\pi}{4} D_i^2 p \quad (4\text{-}1)$$

$$F_i = \frac{\pi}{2} D_i^2 p$$

(2) The axial tension $F_G$ acted by the internal pressure on the hoop and the conical head of the connecting pipe is calculated by following formula:

$$F_G = \frac{\pi}{2} D_G^2 p \quad (4\text{-}2)$$

(3) The axial pre-tensioning force $F_m$ of the gasket is calculated by following formula:

$$F_m = \pi D_G b y \quad (4\text{-}3)$$

When the self-tightening seal gasket is used, $F_m=0$.

In the formula, $b=b_0$, because no flange warping occurs on the conical head of the connecting pipe of the clamping chain.

(4) The Total Axial Tension on the Hoop in the Operating State

The pressure vessel standards of different countries are based on the research results achieved in 1940s, in which the pressure stress on the sealing surface in the operating state is believed to be 2m times of the design pressure p, namely:

$$F_p = 2\pi D_G b m p \quad (4\text{-}4)$$

where, m is the gasket factor which is determined according to the gasket material, type and size. When the self-tightening seal gasket is used, $F_p=0$.

The axial tensile force Ft in the operating state is the sum of the axial force FG generated by the medium pressure and the axial force Fp generated by the sealing pressure stress necessary in the gasket operating state, and can be expressed as:

$$F_t = F_G + F_p = \frac{\pi}{2} D_G^2 p + 2\pi D_G b m p; \quad (4\text{-}5)$$

$$F_t = \frac{\pi}{2} D_G p(D_G + 4b\ m)$$

4.2 Radial Load (1) The internal radial pressure $F_{DJ}$ generated when the gasket is pre-tightened is expressed as:

$$F_{mj} = \pi D_G b\ y\ \tan(\alpha+\mu_2) \quad (4\text{-}6)$$

(2) The total external radial pressure $F_t$ on the hoop in the operating state is expressed as:

$$F_{tj} = \frac{\pi}{2} D_G p(D_G + 4b\ m)\tan(\alpha - \mu_1) \quad (4\text{-}7)$$

The steel-steel friction coefficient $f=0.1\sim1.5$, and the friction angle $\mu=\tan^{-1} f=5.71\sim8.53°\approx5\sim8°$. To guarantee reliable calculation result, the maximum value $\mu_2=8°$ is used during pre-tightening, and the minimum value $\mu_1=5°$ is used in the operating state; namely, the stress is the maximum possible value.

4.3 Bolt and Pin Load

On any radial cross section of the hoop, the total tension to the two sides is $$\frac{2}{\pi}$$

times of the radial pressure. The tension on the two opposite bolts of the hoop (total bolt load) can be calculated accordingly, and is equal to the total load on the two opposite pairs of pins of the hoop.

(1) The total bolt load $F_{mM}$ in the pre-tightening state is:

$$F_{mM} = 2D_G b\ y\ \tan(\alpha+\mu_2) \quad (4\text{-}8)$$

(2) The total bolt load $F_{tm}$ in the operating state is:

$$F_{tM} = D_G p(D_G + 4b\ m)\tan(\alpha-\mu_1) \quad (4\text{-}9)$$

When the bolt size is calculated, the larger value in $F_{mM}$ and $F_{tM}$ is used; namely:

$$F_M = \max(F_{mM}, F_{tM}) \quad (4\text{-}10)$$

4.4 Explanation

In the existing pipe connector of the hoop, the cone surfaces of the hoop and the long neck flange can be fit in only one way—complete fit, which cannot be changed, with the bolts only playing a role of fixing. Therefore, the existing stress analysis and strength calculation formula in the standards and the literatures are all based on false assumption.

In GB 150.3, a pre-loading state is also regulated for hoop strength calculation. In the pre-tightening state, the two sealing surfaces of the hoop connector approach to each other, the outer cone surface of the long neck flange moves outward relative to the inner cone surface of the hoop, and an inward friction force F is generated on the cone surface of the hoop. In the operating state, the two sealing surfaces tend to separate, the outer cone surface of the long neck flange moves inward relative to the inner cone surface of the hoop, the direction of the friction force on the contact surface between the hoop and the long neck flange is opposite to the pre-tightening direction, and an outward friction force F is generated on the cone surface of the hoop. When the pre-tightening state is switched to the operating state, the friction force F on the oblique plane of the hoop turns outward from inward. When the medium pressure rises, at the moment when the two sealing surfaces are about to separate, the friction force on the oblique plane of the hoop is still inward, and the state at this point is called the pre-loading state. The relation between the bolt load and the axial stress can be calculated by replacing $(\alpha-\mu_1)$ in formula (4-9) with (α+μ). Actually, this is only applicable for a situation in the production—excessive instantaneous pressure caused by misoperation at the beginning. This situation only easily occurs to the small-caliber pipe of no more than DN15~25, while the hoop is only applicable for the connection of the large-caliber pipe of at least DN50, and thus the above mentioned situation does not happen to the hoop, or hardly happens.

In GB 150.3, the axial load $F_P$ acted by the internal pressure on the hoop and the conical head of the connecting pipe is expressed as:

$$F_G = \frac{\pi}{4} D_G^2 p \quad (4\text{-}2a)$$

This is the single-side axial stress acted by the internal pressure on the hoop and the conical head of the connecting pipe, and is obviously wrong. GB 150.1 specifies that the safety factor of the tensile strength of carbon steel and low-alloy steel is $n_b=2.7$, and the safety factor of the yield strength is $n_s=1.5$, except the bolts; the safety factor of the yield strength of the carbon steel bolts is $n_{sm}=2.7$. $n_{sm}/n_s=1.8$. The safety factor of the yield strength of the bolts is increased. The increase is actually a compensation for the error in formula (4-2a). The axial load of the internal pressure is calculated by formula (4-2), and the safety factor of the bolt yield strength is set to 1.5. The calculation result is the same as the result obtained by using GB 150.3 but more reliable. In this way, the special regulations on the safety factor of the bolt materials are avoided, and the design calculation method is simplified.

5. Size Calculation

The existing design calculation formulas for the hoop sizes are very complex. For example, the number of calculation formulas is up to 37 in GB 150.3. It is supposed that the area of the oblique plane of the connecting pipe is ¼ of the area of the outer cone of the connecting pipe. To calculate the thickness of the conical head of the connecting pipe at the point of tangency, only the strength of ¼ of the circumference at the point of tangency is calculated, and the other ¾ of the circumference can play a reinforcing function. Therefore, to calculate the sizes of the hoop and the connecting pipe, only the wall thickness δ of the connecting pipe, the effective thickness hn of the conical head of the connecting pipe at the point of tangency and the thickness fw of the hoop at the point of tangency are calculated, without considering the bending and deformation of the cone surfaces of the conical head of the connecting pipe and the hoop, thus greatly simplifying the design calculation process.

5.1 Wall Thickness of Connecting Pipe

The existing calculation formulas of pipe wall thickness are simplified approximate formulas which are very complex and obtained before emergence of computers and calculators. According to stress balance, the accurate calculation formula of the pipe wall thickness can be obtained:

$$\delta_D = \frac{D_o}{2\phi(1-C_1)}\left(1 - \sqrt{\frac{1}{1+2p/[\sigma]_{b1}}}\right) \quad (5\text{-}1)$$

The calculation result of the above formula is the same as that of the formula in GB 50316.

5.2 Hoop Wall Thickness

Suppose that the sum of the gap angles at the bolt lugs and the pins of the clamping chain is 60°, i.e., the total arc perimeter of N hoops is 300/360 of the perimeter of the clamping chain. According to force balance, it can be derived that:

$$\frac{F_t}{\frac{\pi}{4}(E_o^2 - E_i^2) \times \frac{5}{6}} = [\sigma]_{b2}, \quad (5\text{-}2)$$

$$\delta_E = 0.5\left(\sqrt{E_i^2 + \frac{2.4pD_G(D_G+4bm)}{[\sigma]_{b2}}} - E_i\right)$$

When the pin ears and the bolt lugs are designed, the total empty angles of the clamping chain shall be less than 60°.

5.3 Thickness of Conical Head of Connecting Pipe at Point of Tangency

According to force balance, it can be derived that:

$$\frac{F_t/2}{\frac{\pi D_f h_{Df}}{4}} = 0.8[\sigma]_{b1}, \quad (5\text{-}3)$$

$$h_{Df} = \frac{F_t}{0 4\pi D_f[\sigma]_{b1}}$$

Where, $0.8[\sigma]_{b1}$ is the allowable shear stress.

5.4 Thickness of Hoop at Point of Tangency $$h_{Et} = \frac{F_t}{0.4\pi D_t[\sigma]_{b2}} \quad (5\text{-}4)$$

5.5 Bolt (1) Stud Diameter

For the single-lug hoop, according to force balance, it can be derived that:

$$\frac{F_M}{2 \times \frac{\pi}{4} d_1^2} = [\sigma]_{s3} \quad (5\text{-}5)$$

$$d_1 = \sqrt{\frac{2F_M}{\pi[\sigma]_{s3}}}$$

For the double-lug hoop, the calculation formula is:

$$d_1 = \sqrt{\frac{F_M}{\pi[\sigma]_{S2}}} \quad (5\text{-}6)$$

(2) Lug Calculation

The bending strength of the hoop lugs. The total load of the two opposite pairs of bolts is borne by 4 lugs. The following formula can be derived:

$$[\sigma]_{S3} = 0.75 F_M \frac{L_a}{L_w L_h^2} \quad (5\text{-}7)$$

$$L_h = \sqrt{\frac{0.75 F_{ML_a}}{L_w[\sigma]_{S3}}} \quad (5\text{-}8)$$

Suppose that the arm of force $L_w$=circumscribed circle diameter of the nut+5~6. The lug width is $L_a$, and set $L_a$=0.8E for the single lug, and $L_a$=1.5× circumscribed circle diameter of the nut for the double lugs. The bolt caliber is $d_2$=1.2$d_1$.

5.6 Pin (1) Pin Diameter

Each pin has four shearing surfaces. According to force balance, it can be derived that:

$$\frac{F_M}{2\times\frac{\pi}{4}d_3^2\times 4}=0.8[\sigma]_{b3}, \quad (5-9)$$

$$d_3=\sqrt{\frac{F_M}{16\pi[\sigma]_{b3}}}$$

(2) Pin Ear and Pin Nose (Connectors at Two Ends of Each Hoop)

Suppose that the hole diameter is 1.2 times of the pin diameter, and then $d_4$=1.2$d_3$. Suppose that the pin ear height is $u_1$, and the pin nose height is $u_2$. Set $u_2$=2$u_1$ and $u_2$+2$u_1$=0.8F, and thus $u_1$=0.2F. According to force balance, it can be derived that:

$$\frac{F_M}{(d_5-d_4)\times 0.4F\times 2\times 2}=[\sigma]_{b4}, \quad (5-10)$$

$$d_5=1.2d_4+\frac{F_M}{1.6F[\sigma]_{b4}}$$

5.7 Material Safety Factor

To calculate the allowable stress of the material, the safety factor of the tensile strength $n_b$ and the safety factor $n_s$ of the yield strength of the material are necessary. In GB 150, it is pointed out that "the safety factors currently used in safety regulations and technical standards on pressure vessels are extensive. Many details rely on the safety factors, resulting in the condition that the safety margins of devices or equipment cannot be accurately evaluated". The idea of the American dynamic safety factor introduced in GB 150 is used herein. The lower safety factors among different countries, British standards are used. For pipes of DN≤15 and PN≤100, a factor of 2 is multiplied (where misoperation and over pressure occur the most easily); for pipes of DN20~25 and PN≤40, a factor of 1.5 is multiplied; for pipes of DN32~50 and PN≤40, a factor of 1.2 is multiplied.

TABLE 5-1

Material safety factors in British standards

| Material | Tensile Strength $n_b$ | Yield Strength $n_s$ |
| --- | --- | --- |
| Carbon steel and low-alloy steel | 2.35 | 1.5 |
| Austenitic stainless steel | 2.5 | 1.5 |

5.8 Material Parameters (1) Mechanical Properties

The mechanical properties of the materials used in the embodiment of the invention come from GB 150.2-2011 and GB/T 1220-2000. See Table 5-2.

TABLE 5-2

Mechanical properties of steel forged pieces (MPa)

| Material | 20# | 35# | 16Mn | 30CrMo | 304 | 321 | 316 |
| --- | --- | --- | --- | --- | --- | --- | --- |
| Tensile strength $\sigma_b$ | 410 | 510 | 480 | 620 | 520 | 520 | 520 |
| Yield strength $\sigma_s$ | 235 | 265 | 305 | 440 | | | |

(2) Gasket Factor

In the embodiment of the invention, the seal gasket is the stainless steel—graphite spiral wound gasket, with the gasket factor of m=3 and the specific pressure of γ=17, which is 1.5 times of the specific pressure of the asbestos gasket, 11. In the embodiment of the invention, the sealing surfaces are tongue-groove surfaces. The gasket width b=(tongue width+gasket width)/2 for calculation. In the standards and the literatures, the specific pressure of the stainless steel—graphite spiral wound gasket is y=90. Based on this, after the flange gasket is changed from the asbestos gasket to the metal gasket, the bolt tightening force needs to increase by 8 times, and the flange thickness also needs to increase by 8 times. This is an obvious error, or a simple machine measurement result. Actually, after the flange gasket is changed from the asbestos gasket to the metal gasket, the bolt tightening force needs to be increased slightly but the bolts must be tightened evenly, i.e., the opposite bolts must be tightened one after another for each turn. This is a higher requirement than the asbestos gasket. The clamping chain is very easy to tighten just by tightening the bolts by force. This is one of the advantages of the hoop connector.

6. Design Calculation Result of Invention

According to the above mentioned design method of the invention, the size of the DN50~600 hoop connector is calculated with the pressure being PN25, 40 and 63, the sealing surfaces being the tongue-groove surfaces, the gasket being the stainless steel-graphite spiral wound gasket, and the gasket thickness being 3.2. The connecting pipe designs are listed in tables 6-1, 6-2 and 6-3, and are all typical embodiments. It can be seen from the data in the tables that, the bow length margin is 13~37 mm and the hoop connector distance is 4.7~6.3 mm. The hoop is easy to manufacture with low requirement on the processing precision. The hoop size is obviously much smaller than the flange size, the large-caliber hoop connector does not require very thick bolts like the flange, and costs much less than the flange.

To conduct further comparison with the flange, the hoop connector weight is calculated herein. In the weight comparison of the hoop connector and the flange, the flange weight contains a pair of (two) flanges. The hoop connector weight contains a set of hoop and the conical heads of a pair of connecting pipes. When the conical heads of the connecting pipes are calculated, the outer diameters shall be used, namely, excluding the pipe used when the flange is installed. For easy description, it is called the effective conical head weight herein. The weight of the bolts and the pins of the hoop connector is less than the weight of a set of bolts of the flange. Since having low values, the bolt weight is not considered during weight comparison. The flange weight comes from the value of a welding plate flange in GB/T 9124-2010. The calculation result is listed in the table. It can be seen that the hoop connector weight is only 10~30% of the flange weight. Larger caliber means higher pressure and larger weight difference between the hoop connector and the flange. The effective conical head weight of the connecting pipe of the hoop connector is only 2.5~6% of the flange weight. Since the connecting pipe needs to be stainless steel and the hoop can be carbon steel (galvanized and nickel-plated) when the hoop connector is used in place of the flange, the stainless steel hoop connector is more advantages than the stainless steel flange in the price.

TABLE 6-1

Design result of hoop connector at pressure PN25

| | Nominal diameter DN | | | | | | | | | | | | |
|---|---|---|---|---|---|---|---|---|---|---|---|---|---|
| | 50 | 65 | 80 | 100 | 125 | 150 | 200 | 250 | 300 | 350 | 400 | 500 | 600 |
| Hoop petal number N | 4 | 4 | 4 | 4 | 6 | 6 | 8 | 8 | 8 | 12 | 12 | 16 | 16 |
| Taper angle $\alpha$ | 15 | 15 | 15 | 15 | 15 | 15 | 15 | 15 | 12 | 10 | 10 | 10 | 10 |
| B | 90 | 90 | 90 | 90 | 90 | 90 | 90 | 90 | 90 | 90 | 90 | 90 | 90 |
| $\beta_w$ | 22.5 | 22.5 | 22.5 | 22.5 | 15 | 15 | 11.2 | 11.2 | 11.2 | 7.5 | 7.5 | 5.6 | 5.6 |
| $\Gamma$ | 240 | 240 | 240 | 240 | 300 | 300 | 300 | 300 | 300 | 300 | 300 | 300 | 300 |
| $\gamma_n$ | 60 | 60 | 60 | 60 | 50 | 50 | 37.5 | 37.5 | 37.5 | 25 | 25 | 18.75 | 18.75 |
| Seal groove width | 9 | 9 | 9 | 9 | 9 | 10.5 | 12.5 | 14 | 14.5 | 16 | 15.5 | 17 | 17 |
| Tongue-groove gap | 0.8 | 0.8 | 0.8 | 0.8 | 0.8 | 0.8 | 0.8 | 0.8 | 0.8 | 0.8 | 0.8 | 0.8 | 0.8 |
| B | 5.2 | 6.1 | 6.1 | 6.1 | 6.1 | 6.85 | 7.85 | 8.6 | 8.85 | 9.6 | 9.35 | 10.1 | 10.1 |
| Connecting pipe material | 20# | 20# | 20# | 20# | 20# | 20# | 20# | 20# | 20# | 20# | 20# | 20# | 20# |
| Hoop material | 20# | 20# | 20# | 20# | 20# | 20# | 20# | 20# | 35# | 35# | 35# | 35# | 35# |
| Outer diameter of pipe $D_o$ | 57 | 76 | 89 | 108 | 133 | 159 | 219 | 273 | 325 | 377 | 426 | 530 | 630 |
| Inner diameter of pipe $D_i$ | 50 | 69 | 82 | 101 | 126 | 151 | 207 | 261 | 311 | 361 | 410 | 510 | 610 |
| Transition arc $r_1$ | 6 | 6 | 6 | 7 | 7 | 8 | 8 | 10 | 10 | 10 | 10 | 10 | 10 |
| $D_l$ | 65.9 | 84.9 | 97.9 | 118.4 | 143.4 | 170.9 | 230.9 | 287.8 | 340.8 | 393.5 | 442.5 | 546.5 | 646.5 |
| $D_n$ | 77 | 96 | 109 | 130 | 155 | 183 | 244 | 301 | 354 | 407 | 456 | 560 | 660 |
| $D_w$ | 93 | 112 | 127 | 150 | 175 | 207 | 270 | 329 | 384 | 439 | 488 | 596 | 696 |
| $D_G$ | 55.6 | 74.6 | 87.6 | 107.6 | 132.6 | 157.6 | 214.6 | 268.6 | 318.6 | 368.6 | 418.6 | 519.6 | 619.6 |
| $g_D$ | 0.24 | 0.29 | 0.33 | 0.39 | 0.20 | 0.24 | 0.17 | 0.21 | 0.20 | 0.08 | 0.09 | 0.06 | 0.07 |
| $g_E$ | 1.38 | 1.72 | 1.96 | 2.33 | 1.95 | 2.30 | 1.73 | 2.14 | 2.00 | 0.85 | 0.95 | 0.66 | 0.78 |
| $\Delta g$ | 1.14 | 1.43 | 1.63 | 1.95 | 1.75 | 2.06 | 1.56 | 1.93 | 1.80 | 0.77 | 0.86 | 0.60 | 0.70 |
| Pipe wall thickness $\delta_D$ | 3.5 | 3.5 | 3.5 | 3.5 | 3.5 | 4 | 6 | 6 | 7 | 8 | 8 | 10 | 10 |
| Theoretical value | 0.6 | 0.8 | 0.9 | 1.1 | 1.4 | 1.7 | 2.3 | 2.8 | 3.4 | 3.9 | 4.4 | 5.5 | 6.6 |
| Connecting pipe height H | 50 | 50 | 50 | 50 | 50 | 50 | 50 | 50 | 50 | 50 | 50 | 50 | 50 |
| Shearing thickness $h_{w1}$ | 4 | 4 | 4 | 4 | 4 | 4 | 4 | 4 | 4 | 4 | 4 | 4 | 4 |
| $h_{w2}$ | 6 | 6 | 6 | 6 | 6 | 6 | 6 | 6 | 6 | 6 | 6 | 6 | 6 |
| $h_{n1}$ | 5.9 | 5.9 | 6.1 | 6.3 | 6.5 | 7.0 | 8.3 | 8.5 | 8.0 | 8.7 | 8.7 | 9.1 | 9.1 |
| $h_{n2}$ | 7.9 | 7.9 | 8.1 | 8.3 | 8.5 | 9.0 | 9.3 | 9.5 | 9.0 | 8.7 | 8.7 | 9.1 | 9.1 |
| Theoretical value | 0.23 | 0.29 | 0.30 | 0.31 | 0.37 | 0.43 | 0.57 | 0.69 | 0.56 | 0.45 | 0.51 | 0.62 | 0.72 |
| Outer diameter of hoop $E_o$ | 111 | 130 | 147 | 170 | 197 | 229 | 296 | 355 | 411 | 467 | 516 | 626 | 726 |
| Inner diameter of hoop $E_i$ | 101 | 120 | 136 | 159 | 185 | 217 | 280 | 339 | 395 | 451 | 500 | 610 | 710 |
| Wall thickness $\delta_E$ | 5 | 5 | 5.5 | 5.5 | 6 | 6 | 8 | 8 | 8 | 8 | 8 | 8 | 8 |
| Theoretical value | 0.55 | 0.79 | 0.89 | 1.06 | 1.28 | 1.52 | 2.07 | 2.59 | 2.43 | 2.80 | 3.15 | 3.88 | 4.60 |
| Thickness of point of tangency $f_n$ | 6.85 | 7.89 | 8.17 | 8.96 | 8.77 | 9.77 | 8.94 | 9.71 | 10.26 | 10.01 | 10.02 | 9.64 | 9.65 |
| Thickness of point of tangency $f_w$ | 8.99 | 10.04 | 10.58 | 11.64 | 11.45 | 12.99 | 12.42 | 13.46 | 13.45 | 12.83 | 12.84 | 12.81 | 12.82 |

TABLE 6-1-continued

Design result of hoop connector at pressure PN25

| | Nominal diameter DN | | | | | | | | | | | | |
|---|---|---|---|---|---|---|---|---|---|---|---|---|
| | 50 | 65 | 80 | 100 | 125 | 150 | 200 | 250 | 300 | 350 | 400 | 500 | 600 |
| Theoretical value | 0.19 | 0.25 | 0.25 | 0.27 | 0.33 | 0.38 | 0.51 | 0.63 | 0.41 | 0.34 | 0.38 | 0.47 | 0.55 |
| Hoop height F | 32 | 34 | 35 | 37 | 37 | 40 | 40 | 42 | 42 | 42 | 42 | 42 | 42 |
| Single-lug bolt $d_1$ | 8 | 8 | 8 | 10 | 12 | 12 | 14 | 16 | 16 | 16 | 16 | 22 | 24 |
| Theoretical value | 3.9 | 4.9 | 5.4 | 6.0 | 7.1 | 8.4 | 11.1 | 13.6 | 12.5 | 12.1 | 13.5 | 16.5 | 19.4 |
| $L_a$ | 20 | 20 | 20 | 24 | 26 | 26 | 30 | 34 | 34 | 38 | 41 | | |
| $L_w$ | 25.6 | 27.2 | 28 | 29.6 | 29.6 | 32 | 32 | 33.6 | 33.6 | 33.6 | 33.6 | | |
| $L_h$ | 6 | 7 | 7 | 8 | 10 | 11 | 13 | 15 | 15 | 16 | 18 | | |
| $L_h$ theoretical value | 3.6 | 4.4 | 4.7 | 5.6 | 6.9 | 7.8 | 11.1 | 14.1 | 12.3 | 12.6 | 14.6 | | |
| Double-lug bolt $d_1$ | 6 | 6 | 6 | 8 | 10 | 10 | 12 | 14 | 14 | 14 | 14 | 14 | 16 |
| Theoretical value | 2.8 | 3.5 | 3.8 | 4.3 | 5.0 | 5.9 | 7.9 | 9.6 | 8.8 | 8.5 | 9.5 | 11.7 | 13.7 |
| $L_a$ | 17 | 17 | 17 | 20 | 25 | 25 | 27 | 30 | 30 | 30 | 30 | 33 | 33 |
| $L_w$ | 18 | 18 | 18 | 23 | 28 | 28 | 32 | 37 | 37 | 37 | 37 | 37 | 42 |
| $L_h$ | 6 | 7 | 7 | 7 | 8 | 8 | 10 | 11 | 11 | 11 | 12 | 13 | 14 |
| $L_h$ theoretical value | 2.8 | 3.5 | 3.8 | 4.1 | 4.9 | 5.8 | 7.4 | 8.9 | 7.8 | 7.5 | 8.4 | 10.8 | 11.9 |
| Pin diameter $d_3$ | 6 | 6 | 6 | 8 | 8 | 8 | 10 | 10 | 10 | 10 | 10 | 12 | 14 |
| Theoretical value | 2.1 | 2.6 | 2.8 | 3.2 | 3.8 | 4.4 | 5.9 | 7.2 | 6.3 | 6.1 | 6.8 | 8.3 | 9.8 |
| Ear diameter $d_5$ | 12 | 12 | 12 | 15 | 17 | 17 | 20 | 20 | 20 | 20 | 20 | 22 | 24 |
| Theoretical value | 7.0 | 7.2 | 7.3 | 9.7 | 10.0 | 10.4 | 13.7 | 14.9 | 14.0 | 13.8 | 14.5 | 18.4 | 22.6 |
| Bow length ratio ω | 2.5 | 2.4 | 2.4 | 2.4 | 3.1 | 3.1 | 3.1 | 3.1 | 3.2 | 3.2 | 3.2 | 3.2 | 3.2 |
| Bow length margin ΔC | 13.5 | 13.8 | 15.7 | 18.7 | 22 | 25.9 | 26.6 | 32.9 | 38.8 | 30.2 | 33.9 | 31.4 | 37.1 |
| Hoop connector margin ΔL | 4.7 | 4.5 | 4.3 | 4.4 | 5.1 | 5.2 | 5.9 | 5.8 | 5.7 | 6.3 | 6.2 | 6.4 | 6.3 |
| Flange weight kg | 5.46 | 6.96 | 8.64 | 12.14 | 16.38 | 20.6 | 28.6 | 40.2 | 53.2 | 83.6 | 115.2 | 174 | 254 |
| Hoop weight kg | 1.66 | 2.19 | 2.90 | 3.97 | 5.03 | 7.32 | 11.6 | 16.6 | 19.5 | 22.8 | 26.3 | 38.7 | 48.5 |
| Hoop connector/flange weight % | 30.5 | 31.5 | 33.6 | 32.7 | 30.7 | 35.5 | 40.6 | 41.3 | 36.7 | 27.2 | 22.8 | 22.3 | 19.1 |
| Conical head/flange weight % | 8.7 | 8.6 | 8.6 | 8.4 | 7.4 | 8.4 | 9.4 | 9.4 | 8.2 | 6.4 | 5.2 | 4.6 | 3.7 |

TABLE 6-2

Design result of hoop connector at pressure PN40

| | Nominal diameter DN | | | | | | | | | | | | |
|---|---|---|---|---|---|---|---|---|---|---|---|---|
| | 50 | 65 | 80 | 100 | 125 | 150 | 200 | 250 | 300 | 350 | 400 | 500 | 600 |
| Hoop petal number N | 4 | 4 | 4 | 4 | 6 | 6 | 8 | 8 | 8 | 12 | 12 | 16 | 16 |
| Connecting Pipe material | 20# | 20# | 20# | 20# | 20# | 20# | 20# | 20# | 20# | 20# | 20# | 20# | 20# |
| Hoop material | 35# | 35# | 35# | 35# | 35# | 35# | 35# | 35# | 35# | 35# | 35# | 30CrMo | 30CrMo |
| Pipe wall thickness $\delta_D$ | 3.5 | 3.5 | 3.5 | 3.5 | 3.5 | 4 | 6 | 6 | 7 | 8 | 8 | 10 | 12 |

TABLE 6-2-continued

Design result of hoop connector at pressure PN40

| | Nominal diameter DN | | | | | | | | | | | | |
|---|---|---|---|---|---|---|---|---|---|---|---|---|---|
| | 50 | 65 | 80 | 100 | 125 | 150 | 200 | 250 | 300 | 350 | 400 | 500 | 600 |
| Theoretical value | 0.92 | 1.2 | 1.4 | 1.8 | 2.2 | 2.6 | 3.6 | 4.4 | 5.3 | 6.1 | 6.9 | 8.6 | 10.2 |
| Connecting pipe height H | 50 | 50 | 50 | 50 | 50 | 50 | 50 | 50 | 50 | 50 | 50 | 50 | 50 |
| Shearing thickness $h_{w1}$ | 4 | 4 | 4 | 4 | 4 | 4 | 4 | 4 | 4 | 4 | 4 | 4 | 4 |
| $h_{w2}$ | 6 | 6 | 6 | 6 | 6 | 6 | 6 | 6 | 6 | 6 | 6 | 6 | 6 |
| $h_{n1}$ | 5.9 | 5.9 | 6.1 | 6.3 | 6.5 | 7.0 | 8.3 | 8.5 | 8.0 | 8.7 | 8.7 | 9.1 | 9.1 |
| $h_{n2}$ | 7.9 | 7.9 | 8.1 | 8.3 | 8.5 | 9.0 | 9.3 | 9.5 | 9.0 | 8.7 | 8.7 | 9.1 | 9.1 |
| Theoretical value | 0.36 | 0.45 | 0.47 | 0.49 | 0.58 | 0.68 | 0.90 | 1.09 | 0.88 | 0.72 | 0.80 | 0.97 | 1.14 |
| Outer diameter of hoop $E_o$ | 111 | 130 | 147 | 170 | 197 | 229 | 296 | 355 | 411 | 467 | 516 | 626 | 726 |
| Inner diameter of hoop $E_i$ | 101 | 120 | 136 | 159 | 185 | 217 | 280 | 339 | 395 | 451 | 500 | 610 | 710 |
| Wall thickness $\delta_E$ | 5 | 5 | 5.5 | 5.5 | 6 | 6 | 8 | 8 | 8 | 8 | 8 | 8 | 8 |
| Theoretical value | 0.70 | 1.00 | 1.13 | 1.34 | 1.62 | 1.92 | 2.62 | 3.27 | 3.81 | 4.40 | 4.95 | 5.02 | 5.95 |
| Thickness of point of tangency $f_n$ | 6.85 | 7.89 | 8.17 | 8.96 | 8.77 | 9.77 | 8.94 | 9.71 | 10.26 | 10.01 | 10.02 | 9.64 | 9.65 |
| Thickness of point of tangency $f_w$ | 8.99 | 10.04 | 10.58 | 11.64 | 11.45 | 12.99 | 12.42 | 13.46 | 13.45 | 12.83 | 12.84 | 12.81 | 12.82 |
| Theoretical value | 0.24 | 0.31 | 0.32 | 0.34 | 0.41 | 0.48 | 0.65 | 0.80 | 0.65 | 0.53 | 0.60 | 0.60 | 0.71 |
| Hoop height F | 32 | 34 | 35 | 37 | 37 | 40 | 40 | 42 | 42 | 42 | 42 | 42 | 42 |
| Single-lug bolt $d_1$ | 8 | 8 | 8 | 10 | 12 | 14 | 18 | 18 | 18 | 18 | | | |
| Theoretical value | 4.7 | 5.9 | 6.3 | 7.1 | 8.4 | 9.9 | 13.1 | 16.1 | 15.7 | 15.2 | 16.9 | 16.1 | 18.9 |
| $L_a$ | 20 | 20 | 20 | 24 | 26 | 30 | 38 | 38 | 38 | 38 | | | |
| $L_w$ | 25.6 | 27.2 | 28 | 29.6 | 29.6 | 32 | 32 | 33.6 | 33.6 | 33.6 | | | |
| $L_h$ | 6 | 7 | 7 | 8 | 10 | 11 | 13 | 20 | 20 | 20 | | | |
| $L_h$ theoretical value | 4.0 | 4.9 | 5.2 | 6.3 | 7.7 | 9.4 | 14.0 | 16.8 | 16.3 | 15.8 | | | |
| Double-lug bolt $d_1$ | 3.3 | 4.1 | 4.5 | 5.0 | 6.0 | 7.0 | 9.3 | 11.4 | 11.1 | 10.7 | 12.0 | 11.4 | 13.4 |
| Theoretical value | 6 | 6 | 6 | 8 | 10 | 10 | 14 | 14 | 14 | 14 | 14 | 14 | 18 |
| $L_a$ | 17 | 17 | 17 | 20 | 25 | 25 | 27 | 30 | 30 | 30 | 30 | 33 | 37 |
| $L_w$ | 18 | 18 | 18 | 23 | 28 | 28 | 32 | 37 | 37 | 37 | 37 | 37 | 42 |
| $L_h$ | 6 | 7 | 7 | 7 | 8 | 8 | 10 | 11 | 11 | 11 | 12 | 14 | 16 |
| $L_h$ theoretical value | 3.1 | 3.9 | 4.3 | 4.6 | 5.5 | 6.5 | 8.4 | 10.1 | 9.8 | 9.5 | 10.6 | 12.3 | 14.4 |
| Pin diameter $d_3$ | 6 | 6 | 6 | 8 | 8 | 8 | 10 | 10 | 10 | 10 | 10 | 12 | 14 |
| Theoretical value | 2.4 | 3.0 | 3.2 | 3.6 | 4.3 | 5.0 | 6.6 | 8.1 | 7.9 | 7.7 | 8.5 | 9.5 | 11.1 |
| Ear diameter $d_5$ | 12 | 12 | 12 | 15 | 17 | 17 | 20 | 20 | 20 | 20 | 20 | 22 | 24 |
| Theoretical value | 7.1 | 7.4 | 7.5 | 9.9 | 10.3 | 10.8 | 14.4 | 16.0 | 15.7 | 15.4 | 16.5 | 19.9 | 24.7 |
| Flange weight kg | 5.46 | 6.96 | 8.64 | 12.14 | 16.38 | 21.6 | 35.8 | 59.6 | 90.2 | 133.4 | 194.2 | | |
| Hoop weight kg | 1.66 | 2.19 | 2.90 | 3.97 | 5.03 | 7.32 | 11.62 | 16.60 | 19.55 | 22.77 | 26.29 | 38.75 | 48.54 |
| Hoop connector/flange weight % | 30.5 | 31.5 | 33.6 | 32.7 | 30.7 | 33.9 | 32.4 | 27.9 | 21.7 | 17.1 | 13.5 | | |
| Conical head/flange weight % | 8.7 | 8.6 | 8.6 | 8.4 | 7.4 | 8.0 | 7.5 | 6.3 | 4.9 | 4.0 | 3.1 | | |

TABLE 6-3

Design result of hoop connector at pressure PN63

| | Nominal diameter DN | | | | | | | | | | | | |
|---|---|---|---|---|---|---|---|---|---|---|---|---|---|
| | 50 | 65 | 80 | 100 | 125 | 150 | 200 | 250 | 300 | 350 | 400 | 500 | 600 |
| Hoop petal number N | 4 | 4 | 4 | 4 | 6 | 6 | 8 | 8 | 8 | 12 | 12 | 16 | 16 |
| Connecting pipe material | 20# | 20# | 20# | 20# | 20# | 20# | 20# | 20# | 20# | 20# | 20# | 20# | 20# |
| Hoop material | 35# | 35# | 35# | 35# | 35# | 35# | 35# | 35# | 35# | 35# | 35# | 30CrMo | 30CrMo |
| Pipe wall thickness $\delta_D$ | 3.5 | 3.5 | 3.5 | 3.5 | 4 | 6 | 8 | 8 | 8 | 10 | 10 | 14 | 14 |
| Theoretical value | 1.4 | 1.9 | 2.2 | 2.7 | 3.3 | 4.0 | 5.4 | 6.8 | 6.6 | 7.6 | 8.6 | 10.7 | 12.7 |
| Connecting pipe height H | 50 | 50 | 50 | 50 | 50 | 50 | 50 | 50 | 50 | 50 | 50 | 50 | 50 |
| Shearing thickness $h_{w1}$ | 4 | 4 | 4 | 4 | 4 | 4 | 4 | 4 | 4 | 4 | 4 | 4 | 4 |
| $h_{w2}$ | 6 | 6 | 6 | 6 | 6 | 6 | 6 | 6 | 6 | 6 | 6 | 6 | 6 |
| $h_{n1}$ | 5.9 | 5.9 | 6.1 | 6.3 | 6.5 | 7.0 | 8.3 | 8.5 | 8.0 | 8.7 | 8.7 | 9.1 | 9.1 |
| $h_{n2}$ | 7.9 | 7.9 | 8.1 | 8.3 | 8.5 | 9.0 | 9.3 | 9.5 | 9.0 | 8.7 | 8.7 | 9.1 | 9.1 |
| Theoretical value | 0.56 | 0.70 | 0.73 | 0.77 | 0.90 | 1.03 | 1.34 | 1.64 | 1.08 | 0.89 | 1.00 | 1.24 | 1.45 |
| Outer diameter of hoop $E_o$ | 111 | 130 | 147 | 170 | 197 | 229 | 296 | 355 | 411 | 467 | 516 | 626 | 726 |
| Inner diameter of hoop $E_i$ | 101 | 120 | 136 | 159 | 185 | 217 | 280 | 339 | 395 | 451 | 500 | 610 | 710 |
| Wall thickness $\delta_E$ | 5 | 5 | 5.5 | 5.5 | 6 | 6 | 8 | 8 | 8 | 8 | 8 | 8 | 8 |
| Theoretical value | 0.70 | 1.00 | 1.13 | 1.34 | 1.62 | 1.92 | 2.62 | 3.27 | 3.81 | 4.40 | 4.95 | 5.02 | 5.95 |
| Thickness of point of tangency $f_n$ | 6.85 | 7.89 | 8.17 | 8.96 | 8.77 | 9.77 | 8.94 | 9.71 | 10.26 | 10.01 | 10.02 | 9.64 | 9.65 |
| Thickness of point of tangency $f_w$ | 8.99 | 10.04 | 10.58 | 11.64 | 11.45 | 12.99 | 12.42 | 13.46 | 13.45 | 12.83 | 12.84 | 12.81 | 12.82 |
| Theoretical value | 0.37 | 0.49 | 0.50 | 0.54 | 0.64 | 0.73 | 0.97 | 1.20 | 0.82 | 0.68 | 0.77 | 0.96 | 1.13 |
| Hoop height F | 32 | 34 | 35 | 37 | 37 | 40 | 40 | 42 | 42 | 42 | 42 | 42 | 42 |
| Single-lug bolt $d_1$ | 8 | 10 | 10 | 12 | 14 | 16 | 20 | 24 | 18 | 18 | | | |
| Theoretical value | 5.8 | 7.3 | 7.9 | 8.9 | 10.5 | 12.2 | 16.1 | 19.7 | 15.1 | 14.7 | 16.4 | 20.3 | 23.8 |
| $L_a$ | 20 | 20 | 20 | 24 | 26 | 30 | 38 | 38 | 38 | 38 | | | |
| $L_w$ | 25.6 | 27.2 | 28 | 29.6 | 29.6 | 32 | 32 | 33.6 | 33.6 | 33.6 | | | |
| $L_h$ | 6 | 7 | 7 | 8 | 10 | 11 | 13 | 20 | 20 | 20 | | | |
| $L_h$ theoretical value | 5.0 | 6.1 | 6.6 | 7.8 | 9.6 | 11.6 | 17.2 | 20.5 | 18.3 | 17.9 | | | |
| Double-lug bolt $d_1$ | 6 | 6 | 6 | 8 | 10 | 10 | 14 | 16 | 14 | 14 | 14 | 18 | 20 |
| Theoretical value | 4.1 | 5.2 | 5.6 | 6.3 | 7.4 | 8.6 | 11.4 | 14.0 | 10.6 | 10.4 | 11.6 | 14.4 | 16.8 |
| $L_a$ | 17 | 17 | 17 | 20 | 25 | 25 | 30 | 33 | 31 | 31 | 31 | 36 | 40 |
| $L_w$ | 18 | 18 | 18 | 23 | 28 | 28 | 37 | 42 | 37 | 37 | 37 | 47 | 52 |
| $L_h$ | 6 | 7 | 7 | 7 | 8 | 10 | 13 | 14 | 13 | 14 | 14 | 16 | 18 |
| $L_h$ theoretical value | 3.9 | 4.9 | 5.3 | 5.7 | 6.9 | 8.0 | 10.0 | 12.1 | 11.2 | 10.9 | 12.2 | 14.4 | 16.9 |
| Pin diameter $d_3$ | 6 | 6 | 6 | 8 | 8 | 8 | 10 | 12 | 12 | 12 | 12 | 14 | 16 |
| Theoretical value | 2.9 | 3.7 | 4.0 | 4.5 | 5.3 | 6.2 | 8.1 | 10.0 | 8.9 | 8.6 | 9.7 | 12.0 | 14.0 |
| Ear diameter $d_5$ | 12 | 12 | 12 | 15 | 17 | 17 | 20 | 22 | 22 | 22 | 22 | 28 | 34 |
| Theoretical value | 7.4 | 7.9 | 8.0 | 10.5 | 11.2 | 11.8 | 16.2 | 20.6 | 19.1 | 18.8 | 20.2 | 26.1 | 32.3 |

TABLE 6-3-continued

Design result of hoop connector at pressure PN63

| | Nominal diameter DN | | | | | | | | | | | | |
|---|---|---|---|---|---|---|---|---|---|---|---|---|---|
| | 50 | 65 | 80 | 100 | 125 | 150 | 200 | 250 | 300 | 350 | 400 | 500 | 600 |
| Flange weight kg | 3.99 | 4.73 | 5.9 | 8.05 | 11.7 | 16.9 | 20.5 | 42.1 | 59.1 | 88.7 | 121 | | |
| Hoop weight kg | 1.66 | 2.19 | 2.9 | 3.97 | 5.03 | 7.32 | 11.6 | 16.6 | 19.5 | 22.7 | 26.3 | 40.2 | 51.8 |
| Hoop connector/flange weight % | 20.8 | 23.2 | 24.6 | 24.7 | 21.5 | 21.7 | 28.3 | 19.7 | 16.5 | 12.8 | 10.9 | | |
| Conical head/flange weight % | 6.0 | 6.4 | 6.3 | 6.3 | 5.2 | 5.1 | 6.6 | 4.5 | 3.7 | 3.0 | 2.5 | | |

7. Embodiments

1) A DN100PN25 hoop connector, manufactured according to Table 6-1, at the test water pressure of 5 MPa maintained for 24 hours without leakage.

2) A DN150PN40 hoop connector, manufactured according to Table 6-2, at the test water pressure of 10 MPa maintained for 24 hours without leakage.

I claim:

1. A pipe connector to join functional pipes, comprising a multi-petaled hoop and
a connecting pipe,
wherein
said multi-petaled hoop, is divided into two or more sub-assembly groups,
hoop petals in each sub-assembly group are connected by pins, and
the pins are orientated parallel to an axial direction of the connecting pipe;
the sub-assembly groups are connected by one or more bolts, and
the bolts are perpendicular to the axial direction of the connecting pipe;
each hoop petal is in a shape of a partial ring stud, in which an arc-shaped groove is formed, and the hoop petals are configured to be connected to form a clamping chain;
an upper surface and a lower surface of the arc-shaped groove are symmetrical partial inner cone surfaces, and the partial inner cone surfaces of each hoop petal are protruded in the middle to form trapezoidal surfaces of each hoop pedal, which are parallel to respective surrounding partial inner cone surfaces, a height of the trapezoidal surfaces of the hoop petal are characterized as $g_E$;
one end of the connecting pipe is a pipe head, the other end thereof is a conical head,
the pipe head is configured to be connected with a functional pipe,
and a plurality of concave trapezoidal oblique planes parallel to an outer cone surface of the conical head are formed on the outer cone surface of the conical head, a depth of the concave trapezoidal oblique planes is characterized as $g_D$;
wherein the plurality of concave trapezoidal oblique planes of the conical head of the connecting pipe are configured to receive protruded trapezoidal surfaces of the hoop petal, and $g_E > g_D$;
a seal gasket is provided between conical heads of said connecting pipe and another connecting pipe, and pipe heads of said connecting pipe and another connecting pipe are configured to be respectively joined to the functional pipes.

2. The pipe connector according to claim 1, wherein the pipe connector is part of a valve, and the valve is connected with the connecting pipe through the clamping chain; the connecting pipe has a caliber DN of DN50~700.

3. The pipe connector according to claim 1, wherein a cone angle of the inner cone surface of each hoop petal is between 5-80°, the cone angle is an angle between a normal direction of the inner cone surface of the hoop petal and an axis direction of the multi-petaled hoop or clamping chain.

4. The pipe connector according to claim 1, wherein a number of petals in the multipedal hoop is defined as N, N is an even number, and N does not exceed a number of bolts in the clamping chain.

5. The pipe connector according to claim 3, wherein the cone angle is 10-20°.

6. The pipe connector according to claim 4, wherein the clamping chain forms a circle having a center, two sides of the trapezoidal plane of each hoop pedal extend to the center of the clamp chain, each side of each hoop pedal forming a trapezoidal angle γ, a sum of all the trapezoidal angles formed by the center of the circle is Γ=40–330°, and each trapezoidal angle is γ=Γ/N.

7. The pipe connector according to claim 6, wherein when the connecting pipe and multi-pedaled hoop are assembled, two sides of the trapezoidal oblique plane on the conical head of the connecting head extend to the center, forming a trapezoidal angle β, a sum of the trapezoidal angles formed by the center of the circle is B, B=20–180°, and the ratio of the trapezoidal angle of the hoop pedal γ to the trapezoidal angle of the connecting pipe β is γ/β≥1.1.

8. The pipe connector according to claim 7, wherein the sum of the trapezoidal angles formed by the center of the circle is B, B=90–120°, and the ratio of the trapezoidal angle of the hoop pedal γ to the trapezoidal angle of the connecting pipe β is γ/β≥2.

9. The pipe connector according to claim 1, wherein a bottom surface of the conical head of the connecting pipe is configured to seal under force, by providing a sealing surface with the gasket or using a soft gasket, wherein the sealing surface is selected from a plane, concave-convex surface, tongue groove surface, ring groove surface or inner groove surface of triangular ring.

10. The pipe connector according to claim 1, wherein the pipe head of the connecting pipe is configured to connect to the functional pipe through welding or thread.

11. The pipe connector according to claim 1, wherein the pipe connector is configured to be used in manufacturing valves, by converting traditional flange to the conical head of the connecting pipe, and the valve and the connecting pipe are connected with the clamping chain; a diameter of the connecting pipe is DN15-3000.

12. The pipe connector according to claim 1, wherein $\Delta g = g_E - g_D$ and $\Delta g$ is not lower than 0.7 mm.

* * * * *